United States Patent [19]

Goettelmann et al.

[11] Patent Number: 4,775,953
[45] Date of Patent: Oct. 4, 1988

[54] WORKSTATION WITH TYPEWRITER EMULATION

[75] Inventors: John C. Goettelmann, Point Pleasant; David N. Neal, Eatontown, both of N.J.

[73] Assignees: American Telephone and Telegraph Company, New York, N.Y.; AT&T Information Systems Inc., Morristown, N.J.

[21] Appl. No.: 944,565

[22] Filed: Dec. 22, 1986

[51] Int. Cl.⁴ ............................................... G06F 1/00
[52] U.S. Cl. ................................................... 364/900
[58] Field of Search ... 364/200 MS File, 900 MS File

[56] References Cited

U.S. PATENT DOCUMENTS 4,527,250 7/1985 Galdun et al. ...................... 364/900

OTHER PUBLICATIONS

Promotional brochures #8012 and #8106 for Protype Display Typewriter, 6/85, Protype Corporation, pp. 1-5; 1-8.

Promotional literature for HR-35 Printer, Brother International Corporation, p. 1.
Promotional literature for Minolta Office System/P-CW-1, 1985, Minolta Corporation, pp. 1-2.
Promotional literature for Spacewriter, Quadrex, pp. 1-2.
Special Advertising Supplement entitled "Guide", pp. 20, 22, 25 inclusive, from *Working Woman*, Oct. 1985.

*Primary Examiner*—Raulfe B. Zache
*Attorney, Agent, or Firm*—Ronald D. Slusky

[57] ABSTRACT

A personal computer or workstation is provided with an arrangement whereby the workstation keyboard and printer can be made to emulate the operation of a standard typewriter. The printer associated with the workstation is adapted to receive the workstation keyboard and to hold it in front of the platen and print head at an angle that approximates the angle of a standard typewriter keyboard, while software within the workstation, when called into operation, causes the printer to respond to the keyboard on a keystroke-by-keystroke basis.

9 Claims, 10 Drawing Sheets

WORKSTATION WITH TYPEWRITER EMULATION

BACKGROUND OF THE INVENTION

The present invention relates to personal computers, workstations and the like.

Personal computers and workstations are becoming more and more commonplace in businesses of all sizes. Advantageously, these machines enable secretaries and other office workers to perform electronically and/or more automatically many functions that used to be performed by more manual means. Disadvantageously, however, the secretarial work area still typically must include a separate conventional typewriter to fill out pre-printed forms, type envelopes, etc.

SUMMARY OF THE INVENTION

It is to the elimination of the need for that separate conventional typewriter that the present invention is directed. In accordance with the invention, a personal computer or workstation is provided with an arrangement whereby the workstation keyboard and a suitably designed printer can be made to emulate the operation of, and have the look and feel of, a standard typewriter. In accordance with a first feature of the invention, the printer is designed to receive the workstation keyboard and to hold it such that the keyboard face is held at an angle to the horizontal. In preferred embodiments, the printer has a shelf whose perimeters define an area at least as large as the keyboard and the shelf is designed to receive the keyboard. With the workstation keyboard so placed, the printer/keyboard combination advantageously has very much the look and feel of a conventional typewriter—this being a critically important human factors consideration.

In accordance with another feature of the invention, the keyboard has a top rear edge that is substantially adjacent to an upper surface of the printer when the keyboard is placed on the printer. This spatial relationship is another mechanism which, in accordance with the principles of the invention, promotes the illusion that the keyboard/printer combination is a typewriter.

In accordance with a further feature of the invention, software within the workstation, when called into operation, causes the printer to respond to the keyboard on a keystroke-by-keystroke basis. Thus, as the user depresses a "data" key, i.e., a key associated with a character to be printed, the associated character is immediately printed by the printer and, similarly, as the user depresses a "command" key, such as the "return" key or "backspace" key, the associated function is immediately carried out. Thus even though all keyboard input passes through the workstation, the subjective impression conveyed to the user is precisely the same as when a conventional typewriter is being used. When this software is not in operation, the workstation, keyboard and printer continue to be usable in the conventional manner.

DETAILED DESCRIPTION

Figure 1:
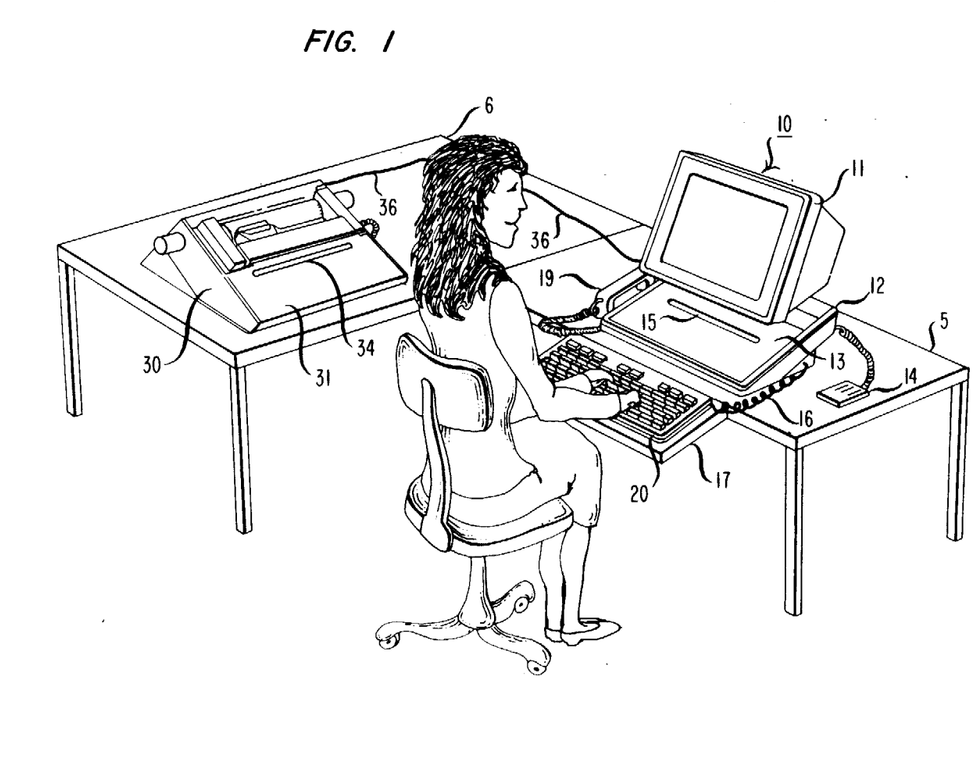
FIG. 1 depicts a secretarial work area having installed thereat a workstation embodying the principles of the present invention, with the various workstation components being arranged in conventional fashion.

A microprocessor-based personal computer, or workstation, 10 embodying the principles of the present invention is depicted in FIG. 1 in the context of a secretarial work area. The workstation includes a reactive display-illustratively a CRT display 11—mounted on a base 12 in which the microprocessor and other workstation circuitry are housed. As depicted in FIG. 1, desk 5, on which the workstation sits, has a slide-out tray 17 on which a movable keyboard 20 can be placed. As shown in detail in FIG. 11, keyboard 20 has a face 21 and a plurality of keys 22 disposed on that face. Keyboard 20 can also be stowed and operated while on face 13 of base 12. When the keyboard is in that position, an elongated protrusion 13f on the keyboard (FIG. 12) engages a matching indentation 15 on face 13 to hold the keyboard in place. The keyboard is illustratively connected into the workstation circuitry via a cable 16.

Associated with workstation 10 is the specially designed printer 30 illustratively connected into the workstation circuitry via a cable 36. The printer is depicted in the FIG. as being located on a second desk 6 which is at right angles to desk 5.

Workstation 10 also includes a telephone handset 19 and, within the workstation housing, associated telephone circuitry.

As is depicted in FIG. 1, a user may sit in front of the workstation and interact therewith via keyboard 20, handset 19 or a mouse 14. For example, the user may interact with a word processing program to create a letter, report, etc., which is then stored in a file in the workstation memory. Whenever hard copy output is desired, an appropriate command is input to the workstation. The latter, in turn, causes the appropriate file to be read out of memory and transmitted to printer 30 which, in turn, prints it.

Workstations of the type just described are used in present-day office environments to do many of the tasks that used to be performed on a typewriter. However, a typewriter is still typically required to perform such tasks as typing envelopes, filling out pre-printed forms, etc. Advantageously, however, the present invention obviates the need for a typewriter in such environments, thereby achieving such advantages as lowering the cost associated with outfitting a secretarial or other work area and reducing the required work space.

Figure 2:
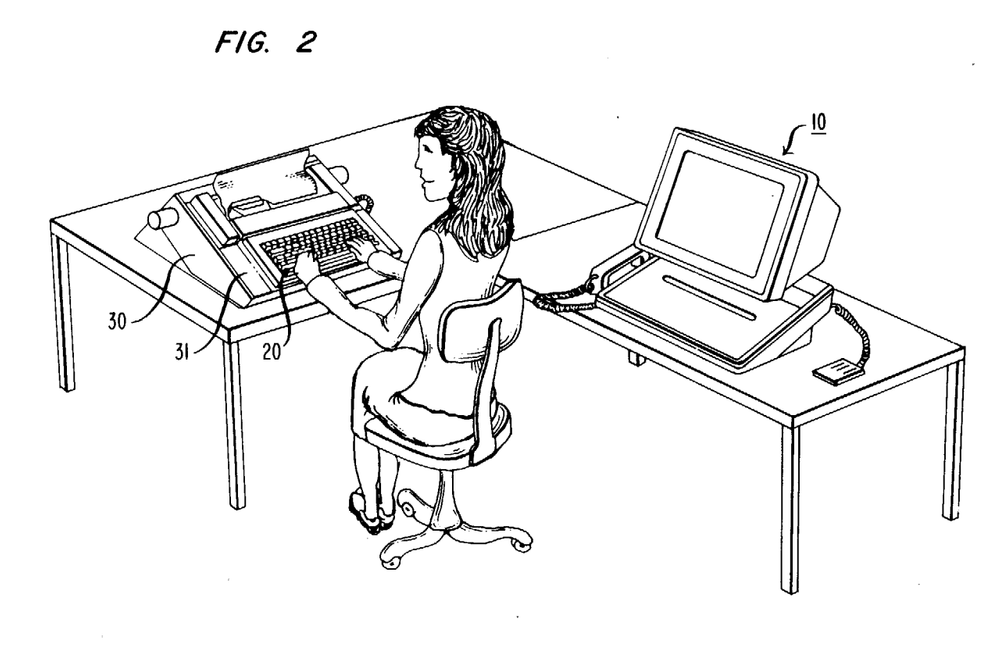
FIG. 2 depicts the work area of FIG. 1 with the workstation keyboard placed on the printer in accordance with the invention.
Figure 3:
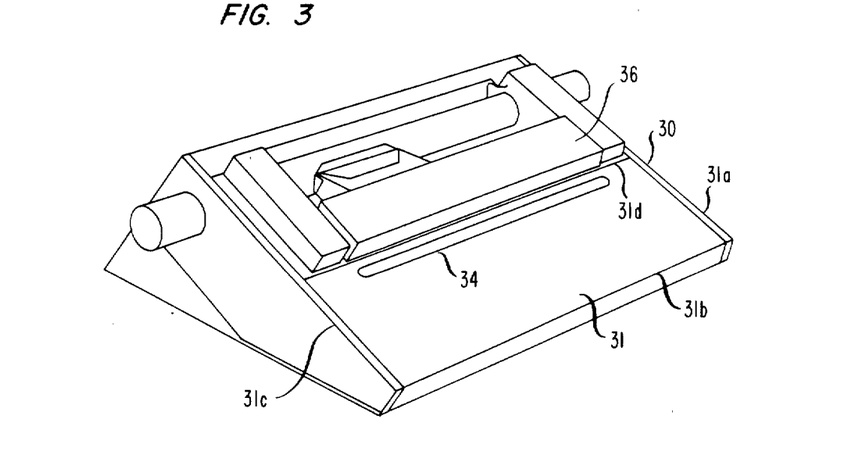
FIG. 3 shows the workstation printer in greater detail.
Figure 4:
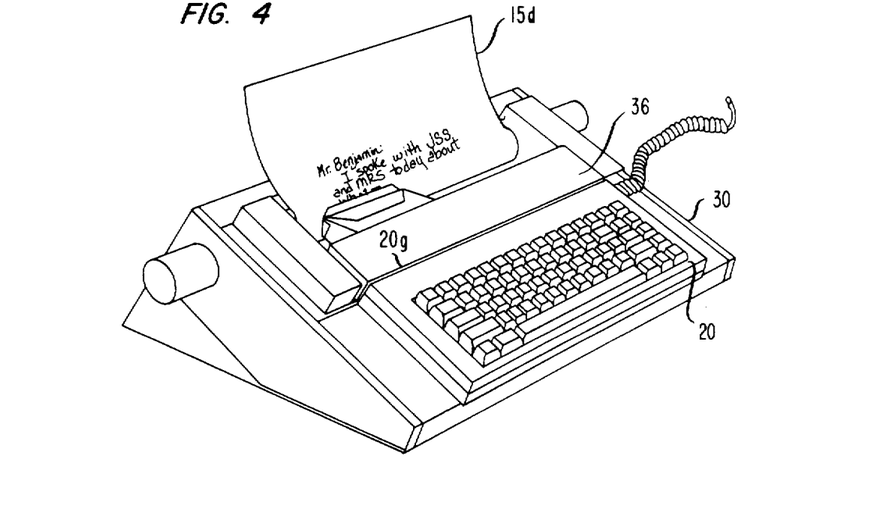
FIG. 4 shows the workstation printer as in FIG. 3 except that the workstation keyboard has been placed thereon in accordance with the invention.

In accordance with the invention, more specifically, the workstation is provided with an arrangement whereby keyboard 20 and printer 30 can, when desired, be operated to emulate the operation of, and to have the look and feel of, a standard typewriter. In accordance with a first feature of the invention, printer 30 is designed to removably hold keyboard 20 such that its face 21 (FIG. 11) is held at an acute angle to the horizontal. In addition, protrusion 13f of the keyboard (FIG. 12) engages a matching indentation 34 on face (or shelf) 31 of the printer. FIG. 2 shows the same work area as FIG. 1 with keyboard 20 placed on face 31 of printer 30 and with the user having positioned herself in front of it. The perimeters of shelf 31, denoted 31a-d in FIG. 3, define an area at least as large as keyboard 20 in both length and width. Thus, when the keyboard is placed on shelf 31, the printer/keyboard combination advantageously has very much the look and feel of a conventional typewriter—this being a critically important human factors consideration. FIGS. 3 and 4 show printer 30 in greater detail, both without keyboard 20 in place (FIG. 3) and with keyboard 20 in place (FIG. 4).

Another design factor which helps the keyboard/printer combination have the look and feel of a conventional typewriter relates to the keyboard layout. Specifically, those keys of keyboard 20 that match those found on a conventional typewriter have a layout and shape that closely follows the conventional typewriter key layout and shape. By contrast, some of the keys on present-day computer- and computer terminal keyboards—particularly the "return" and other function keys—have shapes and/or locations that do not match those typically found on conventional typewriters. In addition, the fact that the user works with only one keyboard—as opposed, for example, to having a computer-style keyboard associated with the CRT and a typewriter-style keyboard associated with the printer—minimizes the need for the user to change his or her mind-set when switching to and from keystroke-by-keystroke operation.

In accordance with a further feature of the invention, the top rear edge 20g of keyboard 20 is substantially adjacent to the upper surface 36 of printer 30 when the keyboard is placed on face 31 of the printer. This spatial relationship is another mechanism which, in accordance with the principles of the invention, promotes the illusion that the keyboard/printer combination is a typewriter.

In accordance with a further feature of the invention, software within workstation 10, when called into operation, causes printer 30 to respond to keyboard 20 on a keystroke-by-keystroke basis. Thus, as the user depresses a "data" key, i.e., a key associated with a character to be printed, the associated character is immediately printed by the printer and, similarly, as the user depresses a "command" key, such as the "return" key or "backspace" key, the associated function is immediately carried out. Thus even though all keyboard input passes through workstation 10, the subjective impression conveyed to the user is precisely the same as when a conventional typewriter is being used, this impression being enhanced by virtue of the keyboard orientation vis-a-vis the platen and printer head. When the aforementioned software is not in operation, the workstation, keyboard and printer continue to be usable in the conventional manner.

Figure 5:
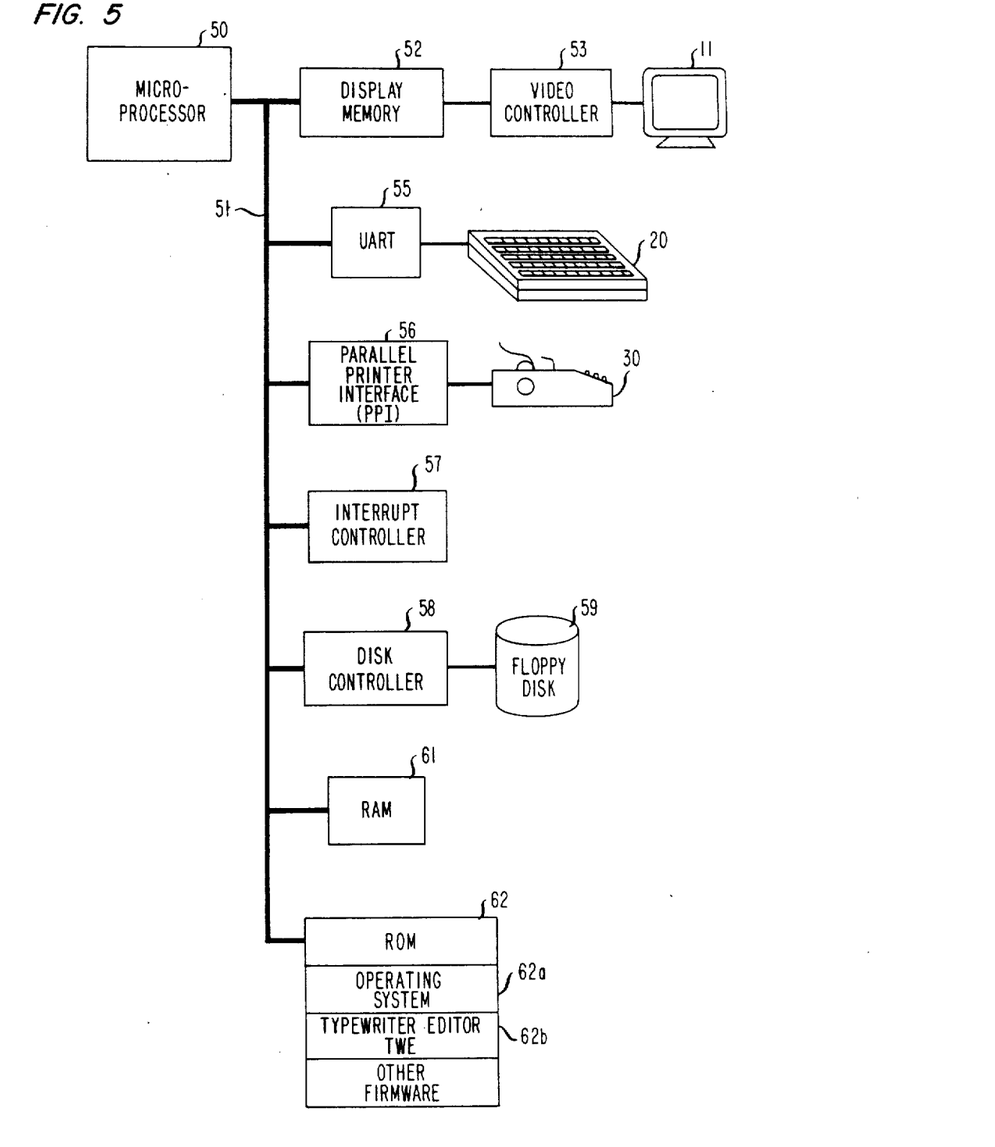
FIG. 5 is a block diagram of the workstation.

The various components of the workstation and their interconnections shown in FIG. 5 are conventional and thus need be described only in general terms.

At the heart of the workstation circuitry is a microprocessor 50 having address, data and control buses denoted generically at 51. Connected to buses 51 are a display memory 52 whose contents are used by a video controller 53 to generate video signals for CRT 11; illustratively, a universal asynchronous receiver transmitter (UART) 55, which serves as a serial interface between microprocessor 50 and keyboard 20; illustratively, a parallel printer interface (PPI) 56, which serves as an interface between microprocessor 50 and printer 30; an interrupt controller 57, to which hardware interrupt leads (not shown) extend, inter alia, from UART 55 and PPI 56; a disk controller 58, which serves as an interface between microprocessor 50 and a floppy or Winchester disk memory 59. The latter holds, for example, individual files of characters previously input from the keyboard or from other sources. Also connected to bus 51 is a random access memory (RAM) 61 and a read-only memory (ROM) 62. The latter includes a firmware copy of the workstation's operating system 62a—illustratively the UNIX ® operating system. Included in the program code of the operating system is code which, in conventional manner, applies characters received from the keyboard to the display and also stores them in individual areas of the files held in memory 59. Other code within the operating system is responsive to commands issued by a user, e.g., the command "print<filename" which, in conventional manner, retrieves the characters in the identified one of the files in memory 59 and applies them to the printer.

ROM 62 illustratively also holds various application programs, one of which is the aforementioned typewriter emulation software, embodied as a program referred to as "twe" (typewriter editor) and denoted as 62b in FIG. 5. (That software could, alternatively, be loaded into RAM 61 from the floppy disk drive.) One way that this program can be invoked in the present illustrative embodiment is to explicitly call it from the UNIX system command line and, in that call, specify such parameters as the size of the paper to be used, the location of the top, bottom, left and right margins, and the printer pitch. Thus, for example, the call twe-L12-W9-t2-b3-l2-r2-p10 specifies that the paper is 12 inches long and 9 inches wide; that the top, bottom, left and right margins are to be 2, 3, 2 and 2 inches, respectively; and that the printer pitch is to be 10 characters per inch. In the absence of an explicit specification of any of these parameters, default values would be assumed.

Another possibility could be to provide a microswitch arrangement whereby, when keyboard 20 is placed on face 31 of printer 30, a hardware interrupt is generated which, when serviced, invokes the "twe" program with particular parameter default values. Such arrangements are not implemented in the present illustrative embodiment, however.

The present embodiment does, however, provide a second mechanism for invoking the "twe" program, that being via a windowing interface whereby various tasks that the user may be performing are displayed as separate screen areas called "windows". The functionality and ways of implementing this windowing capability are well-known in the art. Indeed, windowing is a feature of a number of commercially marketed computers and workstations including, for example, the AT&T PC 7300. It will be helpful, however, to review the windowing capability of workstation 10 to set the environment for the present invention.

Figure 6:
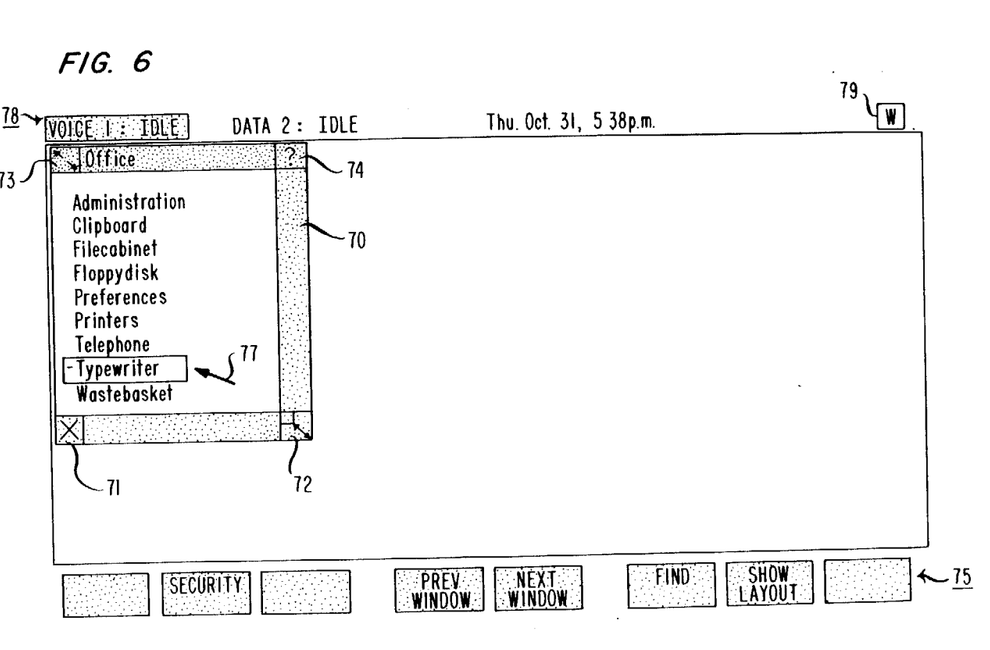
FIGS. 6–8 depict various "windows" that are displayed on the workstation screen at various points during workstation operation.

Referring, then, to FIG. 6, there is shown a so-called Office window 70 that is displayed after the computer is turned on and has performed some initial tasks. The Office window displays a menu of so-called "objects". In particular, the "Administration" object contains functions used for computer housekeeping and maintenance purposes; the "Clipboard" is a temporary location for information being transferred from one place to another; the "Filecabinet" is where work done by the user is stored; the "Floppydisk" object invokes various floppy disk functions; the "Preferences" object is used to customize the environment and displays on the computer; "Printers" gives information about queued printer jobs and allows the user to control various printer functions; the "Telephone" object contains various commands and functions associated with telephone; the "Typewriter" object is the functionality to which the present invention is directed; and the "Wastebasket" object contains information that has been previously deleted.

In addition, a so-called status line 78 is always displayed at the top of the screen. The workstation has the capability of having connected thereto two telephone lines—one of which, in this example, has been designated in Administration to be a "voice" line and the other a "data" line—and the status line shows the current status of each line, e.g., IDLE, ACTIVE, HOLD, etc. Highlighting shows which of the two lines is currently "selected". The current date and time, as well as a window manager icon 79 discussed below, are also displayed.

Figure 11:
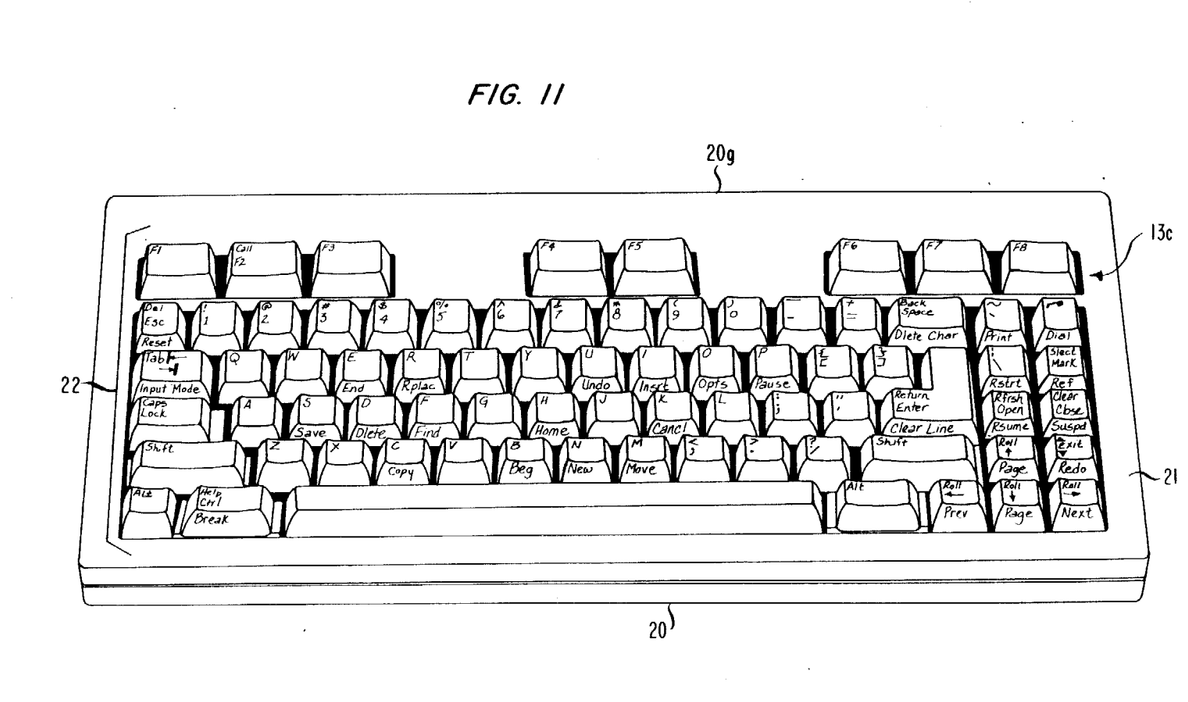
FIG. 11 is a top perspective view of the workstation keyboard.
Figure 12:
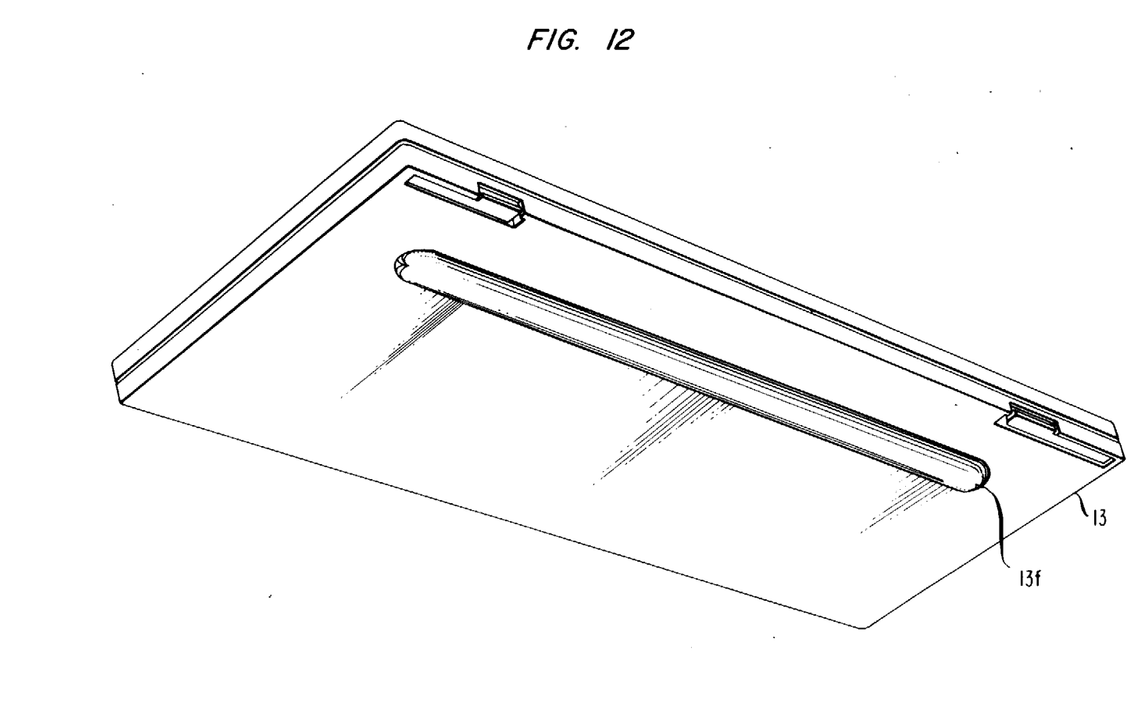
FIG. 12 is a bottom perspective view of the workstation keyboard.

The screen display also includes eight screen keys 75 which bear legends corresponding to the current functions that will be performed in response to the operation of the spatially corresponding ones of keyboard function keys 13c (FIG. 11). These labels and the corresponding functions are changed from time to time as different windows are displayed and/or different computer functions invoked.

The user is provided with a number of capabilities with respect to whatever window is currently being worked with. For example, the user "points to" the particular object desired to be accessed by causing it to be highlighted. In FIG. 6, in particular, the Typewriter object in the Office window is highlighted. The highlighting is controlled either via movement of mouse 14 in such a way that cursor 77 points to the object in question, or by depressing the "ALT" key in conjunction with particular ones of the alphabetic keys. Note, for example, that the "B" key bears the legend "Beg" (begin) on its front surface. Depressing the "B" concurrently with the "ALT" key, hereinafter denoted "ALT-B", causes the top item in the list to be pointed to, or highlighted. ALT-E similarly doubles as an "End" key that causes the last item in the list to be pointed to. The ALT functions of other keys can be invoked to highlight the "Next" or "Previous" items, and so forth. A window can be closed by, for example, either operating the Exit key or pointing to exit icon 71 of window 70 with mouse-controlled cursor 77 and then "selecting" the icon by depressing a key on the mouse. Other window icons include help icon 74, window sizing icon 72, and window movement icon 73. (It may also be noted at this point that status line 79 further includes a window manager icon 79 which, when pointed to and selected, displays a window which shows all of the then-open windows, any of which can be made the "active" window by pointing to and selecting it.)

Figure 7:
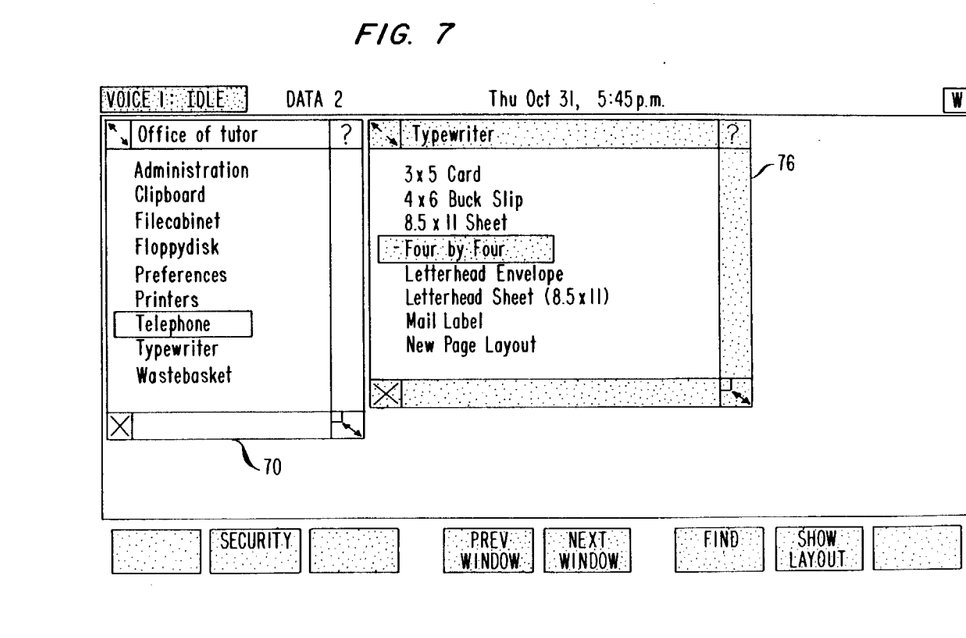

Once the desired object—"Typewriter" in this case—is pointed to and selected by the user, a second window, Typewriter window 76, is displayed on screen 11 next to Office window 70, as shown in FIG. 7. Note that this window, like all windows created by the system, has its own set of icons. Note also that Typewriter window 76 has a dark border, indicating that it is now the "active" window, while the border of the Office window, originally dark, is now light.

Displayed in Typewriter window 76 are format entries such as "3×5 Card", "4×6 Buck Slip", etc. Associated with each of these entries is a set of parameter values defining, for example, a particular page length and width, margin locations and printer pitch. When the user points to and selects an entry, the windowing interface calls the "twe" program and, in that call, passes those parameter values to the program.

The user may also point to the entry "New Page Layout". This option will not be discussed in further detail herein except to note that selecting this entry invokes a program that allows the user to define a new format whose name will thereafter appear in window 76.

Assume that the keyboard 20 has been lifted from base 12 or shelf 17 and placed on printer 30. A piece of blank paper or a pre-printed paper form 15d (FIG. 4) of the appropriate size is inserted into the platen and the user is ready to type, with each keystroke being matched one-for-one by the operation of the printer in a manner described in further detail hereinbelow. (The printer may be optionally provided with a tractor feed/sprocket hole arrangement).

Figure 8:
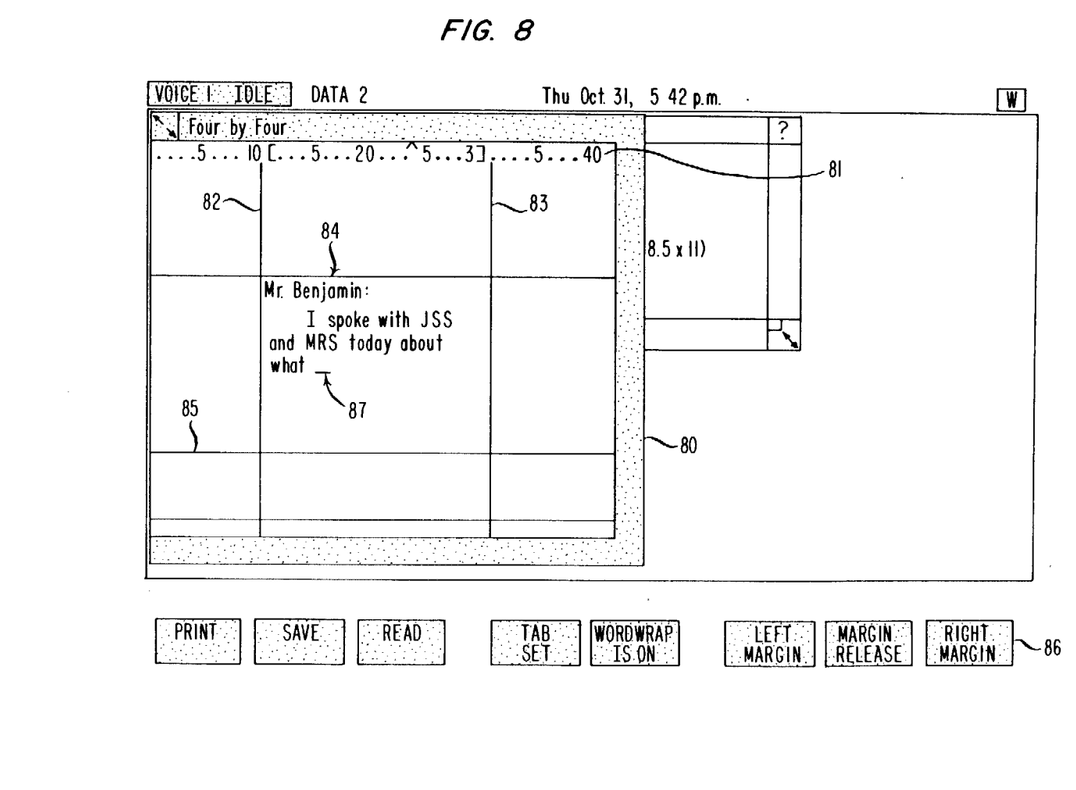

Concurrent with the selection of the desired format, a window 80 appears on the screen, as shown in FIG. 8. Within window 80 are displayed (a) the name, e.g., "Four by Four", of the format selected from window 76, (b) a scale 81 having a tick mark for each available character location and (c) margin lines 82–85. As the keyboard keys are depressed and the corresponding characters are typed onto paper 15d, as seen in FIG. 4, those characters also appear in window 80, as seen in FIG. 8, with a cursor 87 marking where the next typed character will appear. Open and close brackets in scale 81 show the left and right margin locations and carets show the location of tab stops. The margins and tab stops can be changed via operation of various ones of a new set of screen keys 86 that appear concurrently with window 80. Other screen keys include a margin release key and a "save" key which, when operated, prompts the user for the name of a file in which the typed material is to be saved.

Figure 9:
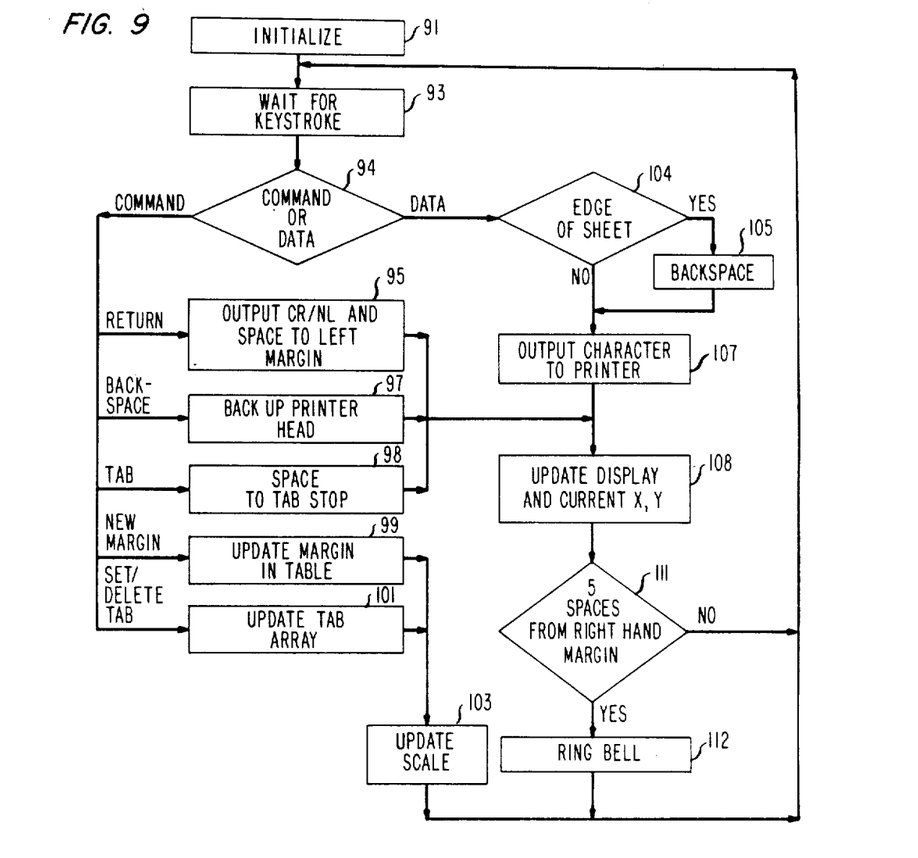
FIG. 9 is a flowchart of a program within the workstation that causes the printer to respond to the keyboard on a keystroke-by-keystroke basis.

The operation of the program "twe" is depicted in flowchart form in FIG. 9. As indicated at 91, the program first performs some initialization. This principally involves (a) executing the UNIX system "open" command to "attach" printer 30 to the "twe" program, (b) invoking a window creation service to create window 80, (c) generating scale 81, and (d) initializing the entries in a table of parameters 110 shown in FIG. 10, those parameters including the above-mentioned sheet dimensions and margin locations and further including the current x and y positions of cursor 87 and an array specifying the current tab settings. Table 110 is illustratively maintained in RAM 61.

Figure 10:
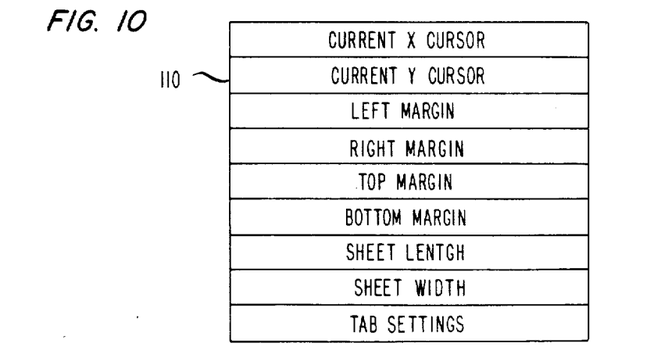
FIG. 10 is a table of parameters maintained within the workstation memory and used by the aforementioned program.

The program thereupon proceeds to block 93, where it waits until the user depresses a keyboard key. If a data key was depressed, the program proceeds to block 104 where it determines from the current x location and sheet width parameters stored in table 110 whether the right-hand edge of the sheet has already been reached. (Emulating in detail the operation of a conventional typewriter, the program will sound the workstation "bell" or beeper when the right-hand margin is approached, but will allow printing all the way out to the edge of the sheet.) If the edge of the sheet has not been reached, the program immediately outputs the character in question to the printer, as indicated at 107. If the edge of the sheet has been reached, however, the program first outputs a backspace, as indicated at 105, thereby striking the new character over the previous one. (In other embodiments, the program might simply ignore any data keystrokes entered when the edge of the paper has been reached.) The program then proceeds to block 108 at which it updates the display in window 80 by both adding the new character and moving cursor 86. The x and y cursor position parameters in table 110 are also updated, as needed.

If the current printing location is now five spaces away from the right-hand margin, the workstation "bell" or beeper is sounded, as indicated at 111 and 112 and, in either event, the program returns to block 93 to await the next keystroke.

If, instead of a data key, the user depresses a command key, the program proceeds from block 94 to one of blocks 95, 97, 98, 99 or 101.

In particular, if the "return" key was depressed, the program, as indicated at 95, sequentially outputs to the printer (a) a carriage return (CR) character, which returns the printer head to its leftmost position, (b) a newline (NL) character which advances the sheet to the next line and (c) the appropriate number of spaces to bring the printer head to the left-hand margin. If the backspace key was depressed, the program simply backs up the printer head, as indicated at 97, while if the tab key was depressed, the program outputs the appropriate number of spaces to bring the printer head to the next tab stop as indicated at 98. In any of these three cases, the program then proceeds to block 108 and execution proceeds as already described.

Alternatively, if the margin or tab set/delete key was depressed, the appropriate data in table 110 is updated, as indicated at 99 and 101, respectively. Scale 81 is then updated to reflect the change, as indicated at 103. Since neither of these commands has an effect on the display in window 80 or the cursor position, the program immediately proceeds from block 103 back to block 93.

In addition to providing character-at-a-time typewriter emulation and warning bell emulation according to the invention, workstation 10 illustratively also allows the user to specify advanced word processing functions which enable the printer to print (a) a line at a time, i.e., a line is printed only after a carriage return is entered, or (b) a word at a time, i.e., a word is printed only after a word-changing character, such as a space, tab or carriage return is entered. Illustratively, such modes can be specified either as command line options, as part of the above-mentioned parameter sets that define the various formats listed in window 76, or from a menu that can be brought up by pressing ALT-O ("opts"). A further possible option would be to print only on command, such as via the one of screen keys 86 (FIG. 8) labeled "print". When operating the workstation in any of these non-character-at-a-time modes, the user would more than likely choose to place keyboard 20 in front of display 11, such as on shelf 17, rather than on face 31 of printer 30.

Other functions that can be invoked when the workstation is operating in a non-character-at-a-time mode include (a) wordwrap function, which is toggled on and off via the corresponding screen key, (b) a "read" function which, when invoked via the corresponding screen key, prompts the user for the name of a file whose contents are to be read into window 80, and (c) an input mode option, controlled by ALT-TAB, by which the user can select between "overstrike" and "insert" modes when cursor 87 is positioned at a previously entered character.

Additionally, various other keys on the keyboard can be used to move cursor 87 around on the screen and, if the workstation is in the word- or line-at-a-time print mode, operation of these keys will cause any inputted but not yet printed characters to be printed.

The "twe" program is exited by, for example, pointing to and selecting the exit icon of window 76 or by depressing the keyboard "Exit" key. Alternatively, the user can exit by depressing the "Close" key, in response to which the user may be presented with the option of specifying the name of a file into which the typed material is to be saved.

The foregoing merely illustrates the principles of the invention. Those skilled in the art will be able to devise numerous arrangements which, although not explicitly shown or described herein, embody those principles and are thus within the invention's spirit and scope.

What is claimed is:

1. A workstation comprising
    a reactive display,
    a movable keyboard, said keyboard including a keyboard face and a plurality of keys disposed on said face,
    a memory for storing individual files of characters,
    a printer for receiving characters and for printing them on a record medium,
    means responsive to a first command issued by a user of said workstation for retrieving the characters in an identified one of said files and for applying them to said printer,
    means for receiving characters from said keyboard,
    means operative for applying each of said received characters to said display as they are received and for storing them in an individual one of said files,
    said printer removably holding said keyboard such that said keyboard face is held at an angle to the horizontal, and
    means operative in response to a second command issued by said user for thereafter applying each received character to said printer as it is received.

2. A workstation comprising
    a memory,
    a display screen,
    keyboard means for generating alphanumeric characters, said keyboard means including a keyboard face and a plurality of keys disposed on said face,
    means operative as each of said characters is generated for displaying it on said display screen and for storing it in a file in said memory, printer means operative in response to receipt of alphanumeric characters for printing them on a permanent record medium, means operative in response to a first command from a user of said workstation for retrieving the characters stored in said file and for applying those characters to said printer, and means operative in response to a second command issued by said user for thereafter applying each character generated by said keyboard means to said printer as it is generated, said printer having a shelf integral therewith whose perimeters define an area at least as large as said keyboard, said shelf to receive said keyboard.

3. A workstation comprising a keyboard, a memory, means for receiving characters from said keyboard and for storing them in said memory, a printer for printing characters on a record medium, means for retrieving characters previously stored in said memory and for applying them to said printer, and means operative in response to a typewriter emulation command issued by a user of said workstation for applying to said printer each character thereafter received from said keyboard as it is received, a movable keyboard having a face and a plurality of keys disposed on said face, said printer including means integral therewith for receiving said keyboard, said keyboard receiving means and said keyboard being formed such that said keyboard face is held at an acute angle with respect to horizontal.

4. The invention of claim 3 wherein said keyboard receiving means is a shelf whose length and width are each at least as large as said keyboard.

5. A workstation comprising a reactive display, a movable keyboard, said keyboard including a keyboard face and a plurality of keys disposed on said face, a memory for storing individual files of characters, a printer for receiving characters and for printing them on a record medium, means responsive to a first command issued by a user of said workstation for retrieving the characters in an identified one of said files and for applying them to said printer, means for receiving characters from said keyboard, means operative for applying ones of said received characters to said display as they are received and for storing them in an individual one of said files, and means operative in response to a second command issued by said user for thereafter applying each received character to said printer as it is received, said printer having a shelf with an area at least as large as said keyboard, said shelf removably holding said keyboard.

6. A workstation comprising a keyboard, a memory, means for receiving characters from said keyboard and for storing them in said memory, a printer for printing characters on a record medium, said printer having an upper surface, means for retrieving characters previously stored in said memory and for applying them to said printer, and means operative in response to a typewriter emulation command issued by a user of said workstation for applying to said printer each character thereafter received from said keyboard as it is received, a movable keyboard having an upper rear edge, a face and a plurality of keys disposed on said face, said printer including means for receiving said keyboard, said keyboard receiving means and said keyboard being formed such that said upper rear edge of said keyboard is substantially adjacent to said upper surface of said printer.

7. The workstation of claim 6 wherein said means for receiving and said keyboard are formed such that said keyboard face is held at an acute angle with respect to horizontal.

8. The workstation of claim 6 wherein said means for receiving comprises a shelf integral with said printer, said shelf having an area at least as large as said keyboard.

9. The workstation of claim 8 wherein said means for receiving and said keyboard are formed such that said keyboard face is held at an acute angle with respect to horizontal.

* * * * *